United States Patent [19]

Otani

[11] 4,041,754
[45] Aug. 16, 1977

[54] PROCESS FOR PREPARING A POLE PIECE FOR THE ROTOR OF A GENERATOR

[76] Inventor: Shoichi Otani, No. 5-13, 1-chome, Nishi Ogu, Arakawa, Tokyo, Japan

[21] Appl. No.: 715,059

[22] Filed: Aug. 17, 1976

[30] Foreign Application Priority Data

Sept. 4, 1975 Japan .................................. 50-107,808

[51] Int. Cl.² ............................................. B21D 22/00
[52] U.S. Cl. ......................................... 72/356; 72/377
[58] Field of Search ........................... 72/356, 377, 341

[56] References Cited

U.S. PATENT DOCUMENTS

| | | | |
|---|---|---|---|
| 3,036,366 | 5/1962 | Ricks | 72/356 X |
| 3,186,209 | 6/1965 | Friedman | 72/356 X |

Primary Examiner—Leon Gilden

[57] ABSTRACT

A process for preparing a pole piece having spiders bent in the axial direction for the rotor of a generator in which a slug is obtained from a round metal bar, said slug is upset to a disc-shaped member, said member is formed with a plurality of radially and outwardly extending spiders on the outer periphery of and a boss on one surface of said member, said spiders are tapered on one surface and an annular bending recess is formed in said one surface of the spiders, said spiders are bent at said annular bending recess until the outer surface of the spiders lie on a plane right angles to the plane of said member to provide a semiprocessed product, and said semiprocessed product is in succession subjected to coining and sizing steps to thereby provide a complete pole piece having spiders bent in the axial direction.

1 Claim, 15 Drawing Figures

PROCESS FOR PREPARING A POLE PIECE FOR THE ROTOR OF A GENERATOR

BACKGROUND OF THE INVENTION

This invention relates to a process for preparing a piece having spiders bent in the axial direction of the piece and more particularly, to a process for preparing a pole piece for the rotor of a vehicle AC generator.

As more clearly shown in FIG. 9, a pole piece for the rotor of an AC genertor generally comprises a base having a plurality of radial spiders formed on the outer periphery and bent in parallel in the axial direction of the base and a center boss formed on one surface of the base. In use, a pair of such pole pieces are disposed with their bosses positioned in face-to-face relationship and the spiders on one pole piece fitted in the valleys defined between the adjacent spiders on the other pole pieces.

The forging and bending systems have been known as the conventional processes for preparing pole pieces of the type referred to hereinabove. The former or forging system comprises the steps of cutting a slug having a predetermined volume off from a round metal bar of an indefinite length, heading the slug, extruding the headed slug to provide a semiprocessed product having a base and a plurality of bent radial pieces on the periphery of the base and trimming the thus obtained semiprocessed product to provide a complete pole piece. Although this system is a high yield rate process, the system has the disadvantage that the system requires a high capacity press which provides a high processing force and necessiates a large scale facility.

And the latter or bending system comprises the steps of stamping a blank having a plurality of radially and outwardly extending spiders out of a metal plate material, bending the spiders at right angles to the plane of the blank and attaching a boss to one surface of the blank. However since the blank stamped by this system has the radially and outwardly extending spiders, this system is disadvantageous with respect to consumption of material or this system is a low yield rate and uneconomical process. Nevertheless, the bending system has the advantage that the system can be performed by the use of a low capacity press which provides a low processing force. Thus, the forging and bending pole piece preparing systems have their inherent advantages and disadvantages and in consequence, a process for the purpose which is easily carried out and economical has been long wished for.

SUMMARY OF THE INVENTION

Therefore, the present invention is to provide a process for preparing a pole piece for the rotor of an AC generator which attains the above-mentioned wish, which possesses both the advantage of high yield rate inherent in the forging system and that of low processing force inherent in the bending system, which consumes material efficiently and which can be conducted by the use of a low capacity press.

The above and other objects and attendant advantages of the present invention will be more readily apparent to those skilled in the art from a reading of the following detailed description in conjunction with the accompanying drawings which show one preferred embodiment of the invention for illustration purpose only, but not for limiting the scope of the same in any way.

BRIEF DESCRIPTION OF THE DRAWINGS

The accompanying drawings shown various steps of the process for preparing a pole piece for the rotor of an AC generator according to the present invention in which.

PREFERRED EMBODIMENT OF THE INVENTION

The process for preparing a pole piece for the rotor of an AC generator according to the present invention will be now described referring to the accompanying drawings in which various steps of the process are illustrated.

Figures 1, 2:
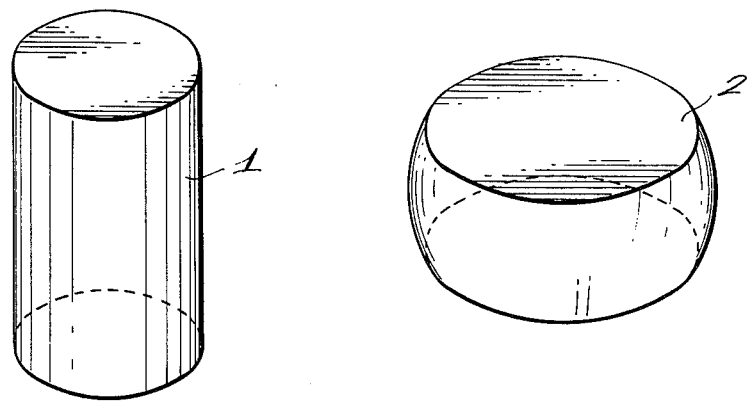
FIG. 1 is a perspective view showing the first step of the process.
FIG. 2 is a perspective view showing the second step of the process.
Figure 3A:
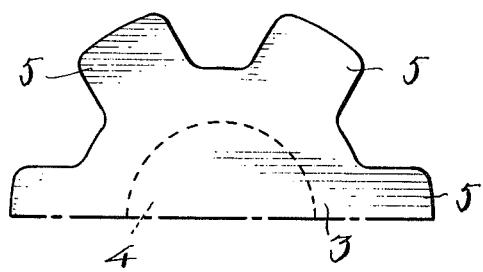
FIG. 3A is a fragmentary view showing the third step of the process.
Figure 3B:
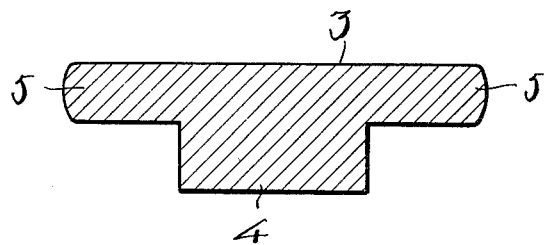
FIG. 3B is a cross-sectional view of FIG. 3A.
Figure 4A:
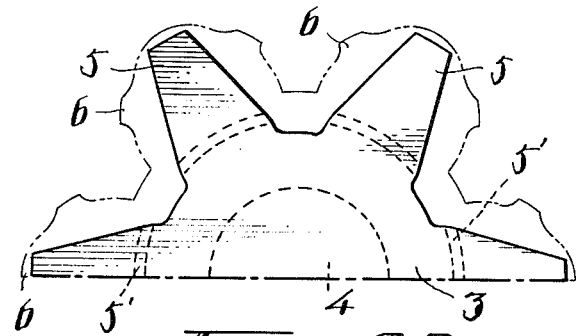
FIG. 4A is a fragmentary top plan view showing the fourth step of the process.
Figure 4B:
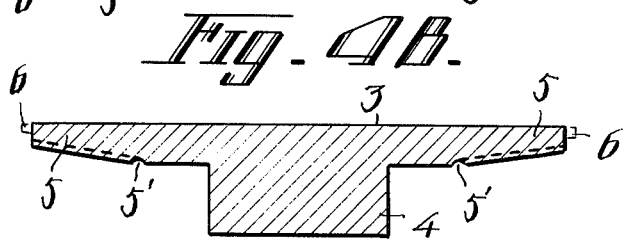
FIG. 4B is a cross-sectional view of FIG. 4A.

In the first step, a slug 1 having a predetermined volume (as shown in FIG. 1) is cut off from an indefinite length of round bar material (not shown) and the slug 1 is upset to a disc-shaped member 2 (as shown in FIG. 2) in the second step. The disc-shaped member 2 is subjected to a first forming step to provide a substantially T-shaped cross-section member having a base 3, a center boss 4 on one major surface of the base and six equally spaced spiders 5 radially and outwardly extending from the outer periphery of the base as shown in FIG. 3. After the first forming step, the T-shaped cross-section member is subjected to a second forming step in which each of the spiders 5 is tapered on one surface which coincides with the surface of the base 3 on which the boss 4 is formed and the opposite sides, in this step there is produced a thin fin 6 about the associated spiders 5 as shown in FIG. 4. Simultaneously, and annular bending recess 5′ is formed on the tapered surface of the spiders 5 as shown in FIG. 4.

Figure 5A:
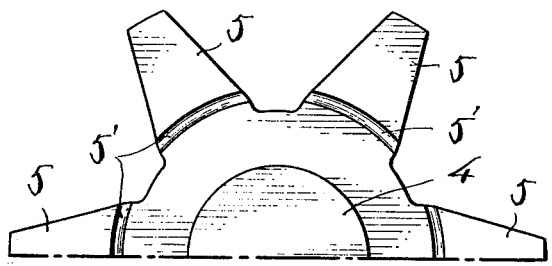
FIG. 5A is a fragmentary top plan view showing the fifth step of the process.
Figure 5B:
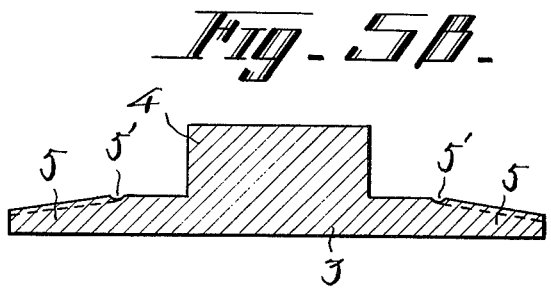
FIG. 5B is a cross-sectional view of FIG. 5A.
Figure 6A:
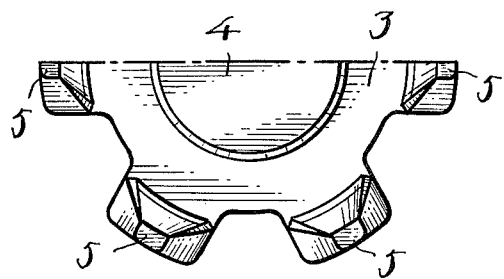
FIG. 6A is a fragmentary bottom view showing the sixth step of the process.
Figure 6B:
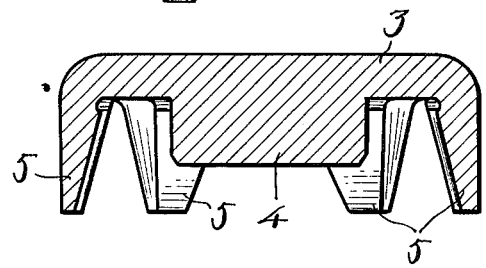
FIG. 6B is a cross-sectional view of FIG. 6A.
Figure 7A:
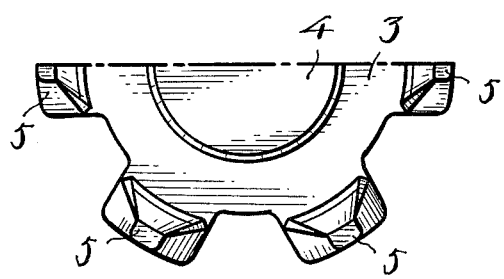
FIG. 7A is a fragmentary bottom view showing the seventh step of the process.
Figure 7B:
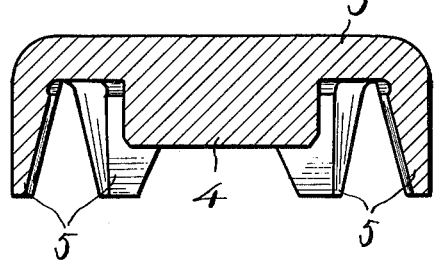
FIG. 7B is a cross-sectional view of FIG. 7A.
Figure 8A:
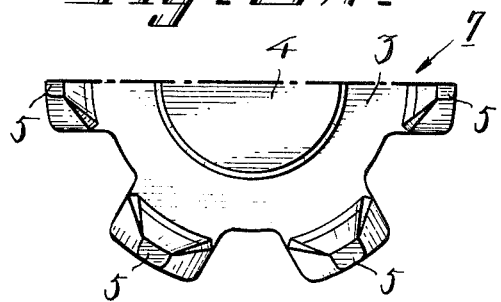
FIG. 8A is a fragmentary bottom view showing the eighth or final step of the process.
Figure 8B:
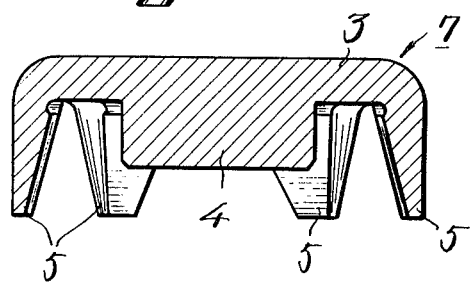
FIG. 8B is a cross-sectional view of FIG. 8A.
Figure 9:
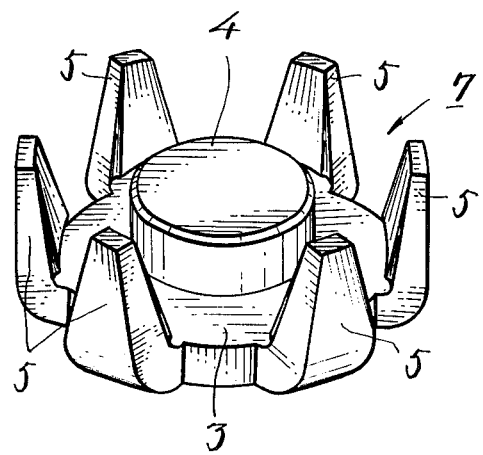
FIG. 9 is a perspective view of a complete pole piece for the rotor of an AC generator.

In the fifth step, the T-shaped member is trimmed to remove the fins 6 therefrom, and thereby obtain a semiprocessed product as shown in FIG. 5. The semiprocessed product is then subjected to the sixth or bending step in which the spiders 5 of the semiprocessed product are bent toward the boss 4 until the non-tapered surface of the spiders 5 lie on a plane at right angles to the plane of the base 3 as shown in FIG. 6 and thereafter, the semiprocessed product is subjected to a coining step (FIG. 7) to eliminate any irregularity which may be present on portions of the semi-processed product. Finally, the thus obtained semiprocessed product is subjected to a final or sizing step (FIG. 8) to produce a complete product or a pole piece 7 for the rotor of an AC generator.

As mentioned hereinabove, according to the process for preparing a pole piece for the rotor of an AC generator of the present invention, the forging steps in which a slug cut off from a round metal bar is in succession processed are combined with the bending step in which the radial spiders formed on the slug and processed in the forging steps so that only the advantages of both the forging and bending systems are utilized in the process of the invention and therefore, the process of the invention has the advantages that the process can be performed with a high yield rate and easiness.

Thus, the process of the invention can be suitably applied to the manufacture of various articles having radial portions bent in the axial direction with respect to the main body of the article as well as pole pieces for the rotors of AC generators.

While only one embodiment of the invention has been shown and described in detail it will be understood tht the same is for illustration purpose only and not to be taken as a definition of the invention, reference being had for this purpose to the appended claim.

I claim:

1. A process for preparing a pole piece for the rotor of a generator comprising the steps of cutting a slug having a predetermined volume of from a round metal bar of an indefinite length, of upsetting said slug to a disc-shaped member, of forming said member to provide a plurality of spiders extending radially and outwardly from the periphery of said member and a center boss on one major surface of the member, of forming said member to taper the opposite sides and one surface of said spiders, of bending of said spiders toward said boss until the nontapered surface of said spiders lie on a plane right angles to the plane of said member, of coining said member to remove any irregularity present on the member and of sizing said member to provide a complete pole piece for the rotor of a generator.

* * * * *